(12) United States Patent
del Pinal et al.

(10) Patent No.: US 8,863,697 B2
(45) Date of Patent: Oct. 21, 2014

(54) PET TOY SOUND MODULE

(75) Inventors: Erwin del Pinal, San Rafael, CA (US); Andrew Murrer, San Rafael, CA (US)

(73) Assignee: Worldwide Inc., San Rafael, CA (US)

( * ) Notice: Subject to any disclaimer, the term of this patent is extended or adjusted under 35 U.S.C. 154(b) by 1328 days.

(21) Appl. No.: 12/369,164

(22) Filed: Feb. 11, 2009

(65) Prior Publication Data
US 2010/0199924 A1  Aug. 12, 2010

(51) Int. Cl.
*A01K 29/00* (2006.01)
*A01K 15/02* (2006.01)

(52) U.S. Cl.
CPC .................................. *A01K 15/025* (2013.01)
USPC ........................................................ 119/709

(58) Field of Classification Search
CPC ............................. A01K 29/00; A01K 15/025
USPC .................... 119/707, 709; 446/397, 398, 475
See application file for complete search history.

(56) References Cited

U.S. PATENT DOCUMENTS

| 2002/0115377 A1* | 8/2002 | Herrenbruck | 446/475 |
| 2004/0077280 A1* | 4/2004 | Kopelle | 446/398 |
| 2007/0119384 A1* | 5/2007 | Ritchey | 119/708 |

* cited by examiner

*Primary Examiner* — Monica Williams
(74) *Attorney, Agent, or Firm* — Bay Area Technology Law Group PC

(57) ABSTRACT

A sound module for insertion within a pet toy. The sound module is in the form of a shell housing an integrated circuit, power source and speaker, the integrated circuit being programmed to generate a signal to the speaker for creating an audible sound. The shell is in the form of a sphere, oval, square or rectangle ideally having a wall for thickness of between 2 mm and 5 mm and composed of acrylonitrile butadiene styrene.

8 Claims, 2 Drawing Sheets

PET TOY SOUND MODULE

TECHNICAL FIELD

A sound module for insertion within a pet toy. The sound module is in the form of a shell housing an integrated circuit, power source and speaker, the integrated circuit being programmed to generate a signal to the speaker for creating an audible sound. The shell is in the form of a sphere, oval, square or rectangle ideally having a wall thickness of between 2 mm and 5 mm and composed of acrylonitrile butadiene styrene

BACKGROUND OF THE INVENTION

The pet toy market is large and growing as pet owners seek creative ways to stimulate their pets and to provide tools for self entertainment, particularly when the pet is alone for extended periods of time. Within this category are toys which are intended to be bitten down upon to satisfy the natural craving of a dog, for example, to chew.

Chew toys are of many different varieties and types. Many of them are plush having a fabric or fur-like outer surface while being configured in the shape of an animal or food item and sized to be bitten down upon by a dog Many of these items come in various sizes recognizing size differences between breeds.

To add further interest, pet toys often contain internally embedded devices, such as sound modules, which provide sounds, oftentimes characteristic of the toy itself, and which are activated either by a simple switch or through movement or pressure For example, reference is made to FIG. 1 in which an animal is depicted having head 11, legs 12 and torso 13 This can be a plush toy and embedded within torso 13 is module 20 It is contemplated that a dog would self entertain by biting down upon torso 13 and shaking pet toy 10 in the process. This could activate sound module 20 to create an audible signal, most ideally being one that is characteristic of the nature and variety of pet toy 10.

The natural tendency of a dog in engaging with pet toy 10 is to bite down upon torso 13 and, upon recognizing a relatively hard object in the form of module 20, to bite further in an attempt to abrade pet toy 10 by continuously grasping and biting the pet toy at module 20. It is thus important in designing such toys to give great consideration to the shape and composition of module 20 to enable it to resist abrading and the destructive nature of a dog's bite while not being overly heavy. Considerations of weight and cost of production are important factors influencing the shape and composition of module 20.

It is thus an object of the present invention to provide a sound module for use as a pet toy which can resist the destructive nature of a dog's bite while minimizing the weight and cost of the module in doing so These and further objects will be more readily apparent when considering the following disclosure and appended claims

SUMMARY OF THE INVENTION

A sound module for insertion within a pet toy, said sound module comprising an integrated circuit, power source and speaker, all housed within a shell, said integrated circuit being programmed to generate a signal to said speaker for creating an audible sound, said shell comprising a shape selected from the group consisting of a sphere, oval, square and rectangle.

DETAILED DESCRIPTION OF THE INVENTION

Figure 1:
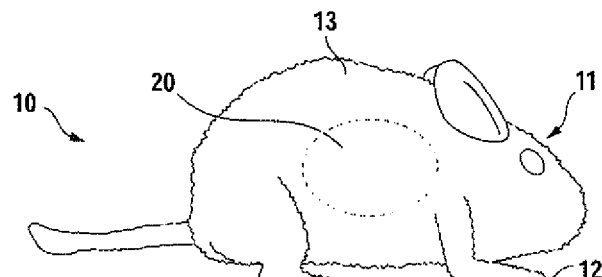
FIG. 1 is a side view of a typical pet toy having a sound module embedded therein

The present invention is in the form of a sound module as well as a pet toy having positioned therein, such a module as depicted in FIG. 1.

Figure 3:
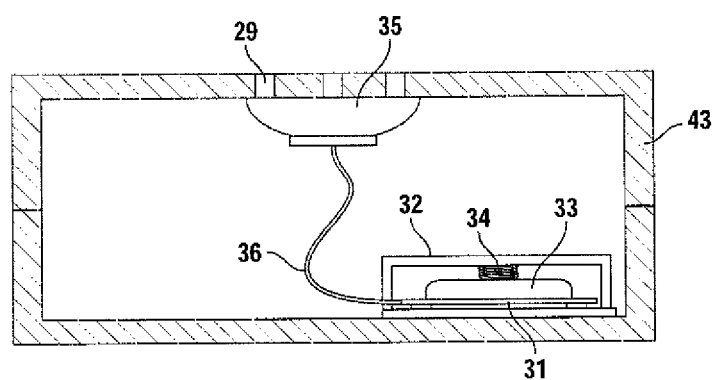
FIG. 3 is a cross sectional view of the sound module of FIG. 2c taken along 3-3

In turning to FIG. 3, the sound module comprises shell 3 and housed therein, integrated circuit 31, power source 33, ideally in the shape of a button battery and speaker 35. Electrical connectors 36 bridge integrated circuit 31 and speaker 35 such that, upon actuation through movement or otherwise, a signal is generated by integrated circuit 31 to speaker 35 causing an audible sound to emanate through openings 27, 28 and 29 of a level to be audible to the pet. Noting that pet toy 10 is likely to be bitten and shaken, as a preferred embodiment, cage 32 is configured as shown in FIG. 3 housing button battery 33 which is held in physical contact with integrated circuit 31 through the use of spring 34 This helps to prevent button battery 33 from being dislodged and thus depriving integrated circuit 31 of power.

Various shapes such as cylinders and the like have been studied to determine how best to configure the sound module to minimize damage when a dog bites down thereon. Of consideration is not only resistance to direct pressure but also the grinding and abrading action which canine teeth can impose upon a chewed object.

Figure 2A:
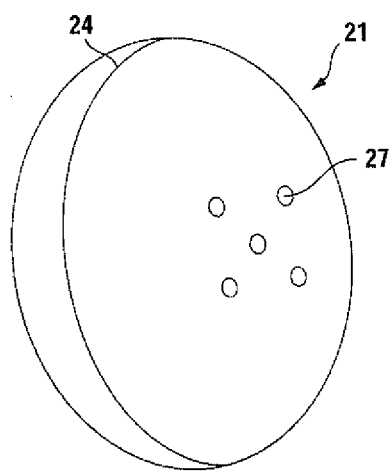
FIGS. 2a, 2b and 2c are perspective views of sound modules of shapes contemplated for use herein.
Figure 2B:
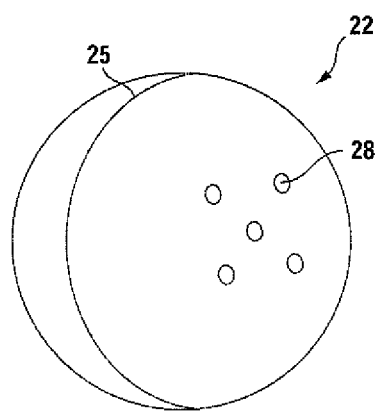
Figure 2C:
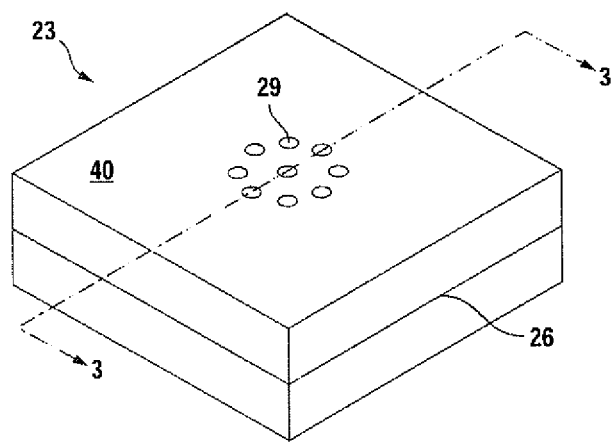

It has been found and made part of the present invention that ideal shapes are modules which are either oval (FIG. 2a), round (FIG. 2b), or square or rectangular (FIG. 2c). An oval shape is shown as module 21 and a round shape shown by module 22. These shapes have sufficient smoothness and abrasion resistance to minimize bite damage. As shown in FIG. 2a, module halves are joined at seam 24 flush with the exterior surface of the module further including openings 27 to enable sound to emanate therefrom. Similarly, round module 22 contains module halves which are joined at seam 25 once the internal components such as shown in FIG. 3 are contained therein.

As noted above, it is the smooth surface devoid of edges that make the oval and round modules of FIGS. 2a and 2b ideal in practicing the present invention. It is also noted that a rectangular or square module such as shown in FIG. 2c can work well in the present environment as a dog would generally bite down upon major surface 40, causing frame halves joined at seam 26 to press against one another rather than being pried apart.

In light of the bite resistant characteristics of the present modules, it is appropriate to use construction materials and wall thicknesses which may otherwise not be appropriate under these circumstances. Certainly if construction costs, module weight and resulting wall thicknesses were not of concern, the issue of modular shape would be of less consequence. However, synergistically, it has been determined that if the module was to be constructed in one of the above-described shapes, it could be composed of acrylonitrile butadiene styrene (ABS), a rather lightweight and relatively easy plastic to work with and to mold When employing ABS, it is also found that the thickness of the shell of the module can be between 2 mm and 5 mm, which is thin enough to minimize the weight burden that such a module would impose upon the pet toy.

Ideally, pet toys 10 are of a plush variety having a fur or cloth outer shell and some type of stuffing enclosed therein as it has been found that pets, particularly dogs, enjoy the tactile feel of such a surface. They tend to bite down on the surface and shake the pet toy activating the sound module. The combination of the tactile surface, stuffing material and rigid sound module shell provides an ideal pet toy for self entertaining With a module which is oval, round, rectangular or square ideally composed of ABS, having a wall thickness between 2 mm and 5 mm, such a toy is not only satisfying but quite durable.

What is claimed is:

1. A plush pet toy for use by a domestic pet, said plush pet toy having a body comprising a fur or cloth outer shell and stuffing enclosed therein sized to be bitten by said pet and positioned therein a sound module comprising an integrated circuit, power source and speaker, all housed within a shell, said integrated circuit being programmed to generate a signal to said speaker for creating an audible sound, said shell comprising a shape selected from the group consisting of a sphere, oval, square and rectangle and wherein said shell comprises a side wall having a thickness between approximately 2 mm and 5 mm.

2. The pet module of claim 1 wherein said shell comprises acrylonitrile butadiene styrene.

3. The pet toy of claim 1 wherein said domestic pet comprises a pet dog.

4. The pet toy of claim 1 wherein said sound is activated by movement of said module.

5. A pet toy for use by a domestic pet, said pet toy having a body sized to be bitten by said pet and positioned therein a sound module comprising an integrated circuit, power source and speaker, all housed within a shell, said integrated circuit being programmed to generate a signal to said speaker for creating an audible sound, said shell comprising a shape selected from the group consisting of a sphere, oval, square and rectangle comprised of acrylonitrile butadiene styrene.

6. The pet toy of claim 5 wherein said power source comprises a button battery.

7. The pet toy of claim 6 wherein said button battery resides within a cage and is spring biased within said cage to resist dislodgement therefrom.

8. The pet toy of claim 5 wherein said pet toy comprises a replica of an animal having a head, legs and a torso, said module being placed within said torso.

* * * * *